(12) United States Patent
Gisby et al.

(10) Patent No.: US 9,332,403 B2
(45) Date of Patent: *May 3, 2016

(54) SYSTEMS AND METHODS FOR GENERATING A CALLING LIST FOR A CONFERENCE CALL

(71) Applicant: BlackBerry Limited, Waterloo (CA)

(72) Inventors: Douglas Gisby, Redwood City, CA (US); Christopher Labrador, Waterloo (CA); Kevin Andrewin, Alpharetta, GA (US); Nicholas Alfano, Hillington (GB)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/503,873

(22) Filed: Oct. 1, 2014

(65) Prior Publication Data

US 2015/0017960 A1    Jan. 15, 2015

Related U.S. Application Data

(63) Continuation of application No. 12/266,062, filed on Nov. 6, 2008, now Pat. No. 8,867,719.

(51) Int. Cl.

| | |
|---|---|
| *H04M 3/42* | (2006.01) |
| *H04M 1/00* | (2006.01) |
| *H04M 11/00* | (2006.01) |
| *H04L 12/16* | (2006.01) |
| *H04Q 11/00* | (2006.01) |
| *H04N 7/14* | (2006.01) |
| *H04W 4/06* | (2009.01) |
| *H04M 3/493* | (2006.01) |
| *H04M 3/56* | (2006.01) |
| *H04M 1/725* | (2006.01) |
| *H04M 1/2745* | (2006.01) |

(52) U.S. Cl.
CPC ............ *H04W 4/06* (2013.01); *H04M 1/72586* (2013.01); *H04M 3/4931* (2013.01); *H04M 3/56* (2013.01); *H04M 3/565* (2013.01); *H04M 1/274575* (2013.01); *H04M 2203/2072* (2013.01); *H04M 2250/62* (2013.01)

(58) Field of Classification Search
CPC .................. H04M 1/274575; H04M 1/72586; H04M 2203/2072; H04M 2203/2094; H04M 2203/5054; H04M 2250/62; H04M 3/42; H04M 3/42221; H04M 3/42246; H04M 3/42348; H04M 3/4931; H04M 3/56; H04M 3/562; H04M 3/563; H04M 3/564; H04M 3/565; H04M 3/566; H04M 3/567; H04M 3/568; H04M 7/006; H04M 7/15; H04M 7/146; H04L 12/18; H04L 12/1813; H04L 12/581; H04L 65/403; H04L 67/24; H04W 4/06
USPC ................ 379/90.01, 93.01, 93.21, 157, 158, 379/201.01, 202.01, 207.01; 370/259, 260, 370/261, 262; 455/414.1, 416
See application file for complete search history.

(56) References Cited

U.S. PATENT DOCUMENTS

| | | | | |
|---|---|---|---|---|
| 6,148,068 | A * | 11/2000 | Lowery | ............... H04L 12/2856 379/202.01 |
| 6,363,411 | B1 * | 3/2002 | Dugan | .............. H04M 3/42136 379/201.01 |
| 7,433,457 | B2 * | 10/2008 | Marwell | ............... H04M 3/432 379/218.01 |
| 8,867,719 | B2 | 10/2014 | Gisby et al. | |
| 2002/0075305 | A1 | 6/2002 | Beaton et al. | |
| 2002/0075306 | A1 | 6/2002 | Thompson et al. | |
| 2003/0108002 | A1 | 6/2003 | Chaney et al. | |
| 2004/0047461 | A1 | 3/2004 | Weisman et al. | |
| 2004/0083195 | A1 | 4/2004 | McCord et al. | |
| 2004/0125937 | A1 | 7/2004 | Turcan et al. | |
| 2005/0097005 | A1 | 5/2005 | Fargo | |
| 2006/0067250 | A1 | 3/2006 | Boyer et al. | |
| 2006/0067252 | A1 | 3/2006 | John et al. | |
| 2006/0221941 | A1 * | 10/2006 | Kishinsky | ............. H04M 3/523 370/352 |
| 2007/0033251 | A1 | 2/2007 | Mandalia et al. | |
| 2007/0115919 | A1 * | 5/2007 | Chahal | ............. H04L 29/06027 370/352 |

| | | | |
|---|---|---|---|
| 2007/0121859 A1 | 5/2007 | Smelyansky et al. | |
| 2007/0136422 A1* | 6/2007 | Ohtani | H04L 29/06027 709/204 |
| 2007/0172047 A1* | 7/2007 | Coughlan | H04M 3/56 379/202.01 |
| 2007/0226035 A1 | 9/2007 | Doss et al. | |
| 2008/0019284 A1 | 1/2008 | John et al. | |
| 2008/0133600 A1* | 6/2008 | Uehori | G06Q 10/10 |
| 2010/0080375 A1 | 4/2010 | Michaelis et al. | |
| 2010/0111279 A1 | 5/2010 | Gisby et al. | |

FOREIGN PATENT DOCUMENTS

| | | |
|---|---|---|
| EP | 0746130 A1 | 12/1996 |
| EP | 0872998 A1 | 10/1998 |
| WO | 2008/037845 A1 | 4/2008 |

OTHER PUBLICATIONS

Office Action in Canadian Application No. 2,683,449, dated Dec. 21, 2011, 3 pages.
Office Action in Canadian Application No. 2,683,449, dated May 9, 2012, 3 pages.
Office Action in Canadian Application No. 2,683,449, dated Jan. 28, 2014, 3 pages.
European Examination Report in Application No. 09153258.0, dated Jan. 20, 2012, 5 pages.
European Examintion Report in Application No. 09153258.0, dated Jan. 14, 2013, 4 pages.
Partial European Search Report in Application No. 09153258.0, dated Jun. 30, 2009, 5 pages.
Canadian Application No. 2,683,449 Office Action dated Mar. 22, 2013, 3 pgs.
Communication Pursuant to Article 94(3) mailed by the European Patent Office in corresponding European application No. 09 153 258.0-1870, dated Aug. 29, 2014, 4 pgs.
European Examination Report (EP App. No. 09153258.0), dated Sep. 9, 2010.
European Search Report (EP App. No. 09153258.0), dated Sep. 24, 2009.
EP Search Report for European Application No. 09153258.0-2414.
IP.com. "Method and System to define Scheduled Chats that Auto-Invite Users Over a Time Period" ip.com, PriorArtDatabase, Available at http://www.priorartdatabase.com/IPCOM/000032347, Nov. 2, 2004.
Freed, J.; "Using Microsoft Outlook A Beginners Guide Email and Calendars"; Microsoft Outlook; Sep. 19, 2002; pp. 1-19.
Summons to attend oral proceedings pursuant to Rule 115(1) EPC by the European Patent Office in European Application No. 09153258.0 on Feb. 3, 2016.

* cited by examiner

*Primary Examiner* — Khai N Nguyen
(74) *Attorney, Agent, or Firm* — Fish & Richardson P.C.

(57) ABSTRACT

Systems and methods are described that facilitate the generation of calling lists for use in planning or setting up conference calls. The system may include a communications module and a contact database comprising a plurality of contact records, each contact record corresponding to a different contact. Each contact record may include at least one contact address and at least one descriptor. For example, the descriptor may include a job title and/or expertise for the contact. The system may also include a selection module configured to select at least one of the contacts and also configured to compare the at least one descriptor to at least one qualifier criteria. The method may include: providing a contact database comprising a plurality of contact records, each contact record corresponding to a different contact; wherein each contact record comprises at least one contact address and at least one descriptor; determining at least one qualifier criteria; comparing the qualifier criteria to the at least one descriptor; determining a calling list corresponding to at least one contact.

10 Claims, 10 Drawing Sheets

SYSTEMS AND METHODS FOR GENERATING A CALLING LIST FOR A CONFERENCE CALL

PRIORITY CLAIM

This is a continuation of application Ser. No. 12/266,062 filed on Nov. 6, 2008, now U.S. Pat. No. 8,867,719, which is incorporated herein by reference in its entirety.

TECHNICAL FIELD

Embodiments described herein relate generally to conference calling, and more specifically to systems and methods that facilitate the generation of calling lists for use in planning or setting up conference calls.

BACKGROUND

Some embodiments described herein make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Most applications for use with such mobile devices have been designed to be stand-alone applications, with a centralized email server providing email, a telephony system providing voice services, an instant messenger service allowing short, informal chats, etc. However, it has been recognized that these services or tools may be enhanced and may improve efficiency if greater interaction between such services was facilitated.

Consider a situation in which clicking on an email while at home automatically initiated a call from the user's enterprise PBX (Private Branch Exchange) to the email sender, or launched an IM (Instant Messaging) session from a problem tracking system to allow informal communications between a support engineer and the customer. This inter-working has become known as "unified communications".

One way to implement a unified communications system is within an enterprise. Proprietary protocols may be introduced, "glue" applications may be written to tie together the administration API (Application Programming Interface) published by one company with an equivalent API from another. However, such solutions require substantial effort to introduce inter-operability with services.

BRIEF DESCRIPTION OF THE DRAWINGS

For a better understanding of embodiments described herein, and to show more clearly how they may be carried into effect, reference will now be made, by way of example, to the accompanying drawings in which.

DETAILED DESCRIPTION

The difficulty in implementing a unified communications system within an enterprise has been recognized and a protocol created that allows the establishment, control and release of sessions between users and servers in a generic and extensible fashion. The Session Initiation Protocol (SIP) has been designed and further enhanced through the IETF (Internet Engineering Task Force). It has been recognized that SIP provides a flexible environment that can be leveraged to bring unified communications to mobile devices.

SIP is an application-layer control (signaling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these.

SIP as defined in RFC 2543 and superseded by RFC 3261 is the IETF's standard for multimedia session management. SIP is an ASCII-based, application-layer control protocol that supports user mobility. It is used to establish, maintain, modify and terminate multimedia sessions between two or more end points. It is important to note that SIP provides the control plane for these sessions; the data plane part of the session uses RTP as the transport protocol. There is no requirement that the data plane and control plane follow the same path through the IP domain.

The SIP protocol allows:

(a) The determination of the location of the target end point. This is achieved by services such as address resolution, name mapping and call redirection.

(b) The determination of target end point availability. This not only provides an indication of whether the end point is available, but also if a call cannot be completed because the target end point is unavailable, SIP determines whether the called party is already on the phone or did not answer in the allotted number of rings.

(c) The determination of the media capabilities of the target end point. By using the Session Description Protocol (SDP), SIP can determine what common services exist between the end points. Thus sessions are established using only the media capabilities that can be supported by all end points.

(d) The establishment of a session between the originating and target end point.

(e) The management of the session. This includes the addition of new end points, the transfer of the session between end points, and the modification of the session such as change of codec or the addition of another data stream.

(f) The termination of sessions.

Figure 1A:
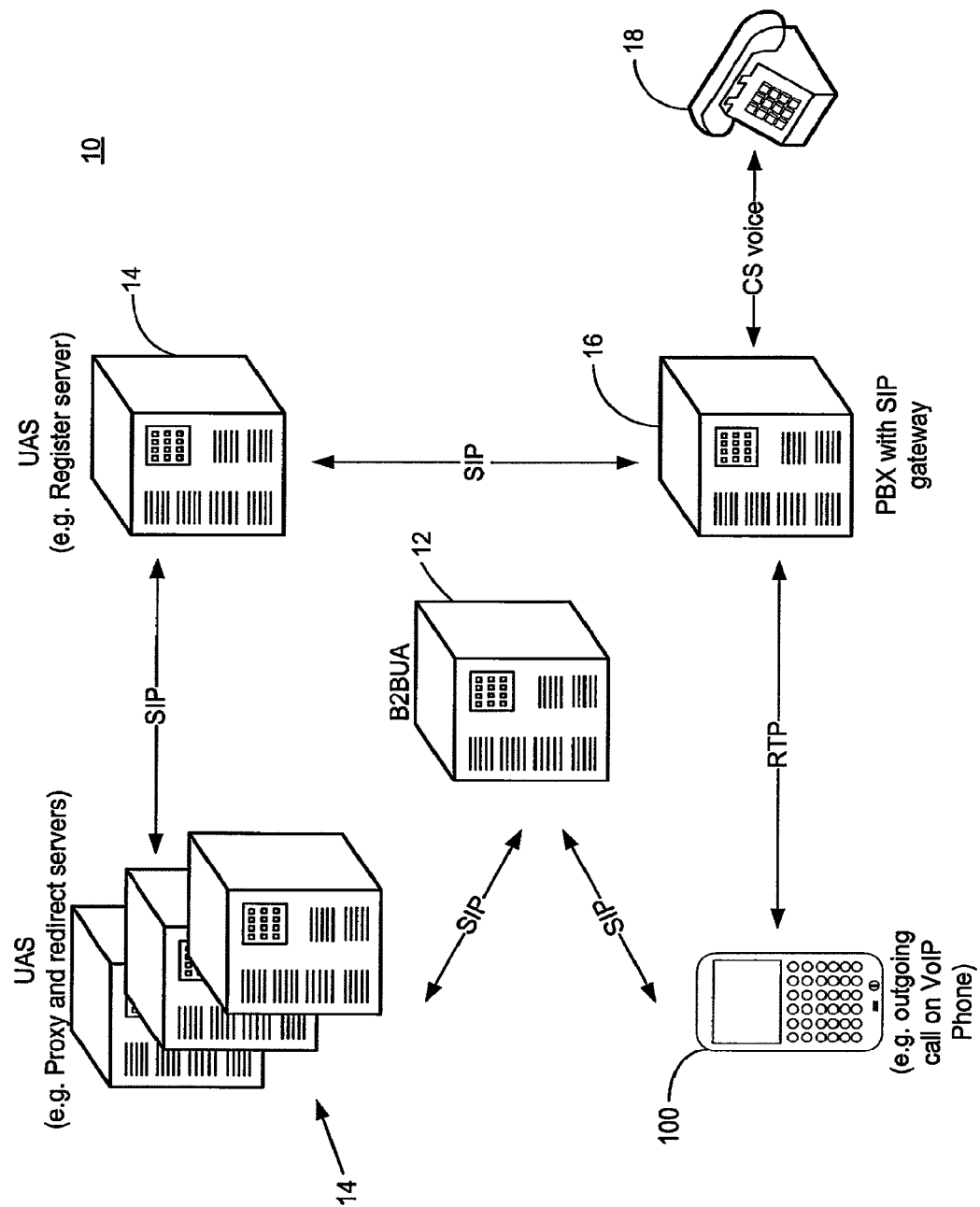
FIG. 1A is a block diagram of a network illustrating the implementation of SIP in a telephony application.

To aid in understanding the implementation of SIP in a telephony application, reference is made to FIG. 1A. An example of a network, shown generally as 10, implementing a call from a VoIP phone is shown in FIG. 1A. Illustrated therein is a call originating from a mobile device 100, discussed in greater detail below, which in this instance is fulfilling the role of User Agent Client (UAC). The call establishment signaling goes via a Back-to-Back User Agent (B2BUA) 12 and through a number of User Agent Servers (UAS) 14 to the PBX 16 (and ultimately to the receiving phone 18) using the SIP signaling. Once the control path is established and the call allowed, the voice media stream is sent via RTP to the PBX 16 directly.

FIG. 1A illustrates several different User Agent (UA) roles:

(a) User Agent Client (UAC)—a client application that initiates the SIP request. Typical clients are soft-phones (PCs that have phone applications) and VoIP based phones such as the BLACKBERRY™ 7270, manufactured by Research in Motion. However, any initiator of an SIP call is a UAC, including network elements such as the B2BUA. Gateways to non-SIP based systems can also act as UACs. A gateway may, for example, map a VoIP based call onto a traditional circuit-switched PBX.

(b) User Agent Server (UAS)—a server application that contacts the registered user when a SIP request is received and returns a response on behalf of the user. A server may be a proxy, which receives SIP messages and forwards them to the next SIP server in the network. Proxy servers can provide functions such as authentication, authorization, network access control, routing, reliable request retransmission, and security. Alternatively, a SIP server may act as a redirector, which provides the client with information about the next hop or hops that a message should take and then the client contacts the next hop server or UAS directly. A server also may act as a registrar server, which processes requests from UACs for registration of their current location.

(c) Back-to-Back User Agent (B2BUA)—a pair of user agents, one a server and the other a client, that terminates a SIP session on one side and maps through any requests to a second SIP session on the other side. A B2BUA provides a way to insert custom control into a SIP session between two end points. A B2BUA can act as a gateway into an enterprise domain where security needs require that all SIP sessions are controlled by a local server.

During any one SIP session, a UA will function either as a UAC or a UAS but not as both simultaneously. SIP provides a means to establish, control and terminate one or more multimedia sessions. However, SIP itself is not an application but a platform on which applications can be built. A SIP application may provide simple voice calling functionality in a low featured softphone, or large and complex functionality such as for an eLearning application that would involve the transmission of voice, video and slides to a multi-participant conference.

While the preceding technical discussion relates generally to the mechanics of establishing the communications links necessary for a conference call, a need exists for systems and methods for assisting in the generation of conference call lists. For large organizations (commercial or otherwise) having many individuals, it may not be possible for a person to know all of the individuals in the organization and their particular areas of interest or skill. As a result, arranging a conference call for an appropriate subset of individuals in the organization may be challenging.

For example, a chief technology officer (CTO) of a large company may wish to arrange a conference call to brainstorm potential development solutions for new product concepts involving biometrics applications. As a result, the CTO may wish to arrange a conference call with employees having an expertise in biometrics applications. If the call is considered particularly confidential, the CTO may also wish potential conference call participants to have a seniority or rank within the company. Systems and methods which assist the CTO in developing a calling list for a conference call in the above example would be helpful.

Accordingly, embodiments described herein are generally directed to systems and methods that facilitate the generation of calling lists for use in planning or setting up conference calls.

In a broad aspect, there is provided a system for generating a calling list for a conference call. The system may include a communications module and a contact database comprising a plurality of contact records, each contact record corresponding to a different contact. Each contact record may include at least one contact address and at least one descriptor. For example, the descriptor may include a job title; seniority; area of interest; and/or expertise for the contact. The system may also include a selection module configured to select at least one of the contacts and also configured to compare the at least one descriptor to at least one qualifier criteria.

In some embodiments, the system may further include an input module operatively coupled to the selection module and configured to receive qualifier criteria. The input module may also be configured to receive at least one proposed call time. A calendar module may also be provided which may be operatively coupled to the selection module and which comprises availability data corresponding to at least one contact. In selecting the at least one selected contact, the selection module may be configured to compare the availability data. The selection module may also be configured to determine at least one proposed call time.

A further aspect is directed towards a method of generating a calling list for a conference call. The method may include the steps of:

(a) providing a contact database comprising a plurality of contact records, each contact record corresponding to a different contact;

(b) wherein each contact record comprises at least one contact address and at least one descriptor;

(c) determining at least one qualifier criteria;

(d) comparing the qualifier criteria to the at least one descriptor;

(e) determining a calling list corresponding to at least one of the contacts.

In some embodiments, determining a calling list may include:

(a) determining a set of at least one of the contacts;
(b) ranking the at least one contact in the set;
(c) displaying the set of contacts in ranked order; and
(d) selecting at least one contact from the set.

In some embodiments, determining a calling list may include: providing availability data corresponding to at least one of the contacts; and comparing the availability data. A proposed call time may also be determined, wherein the calling list is determined corresponding to the proposed call time. In some instances, determining a proposed call time may involve comparing the availability data of the at least one contact.

Some aspects are directed to a calling list generated in accordance with the method(s). Other aspects may be directed to a computer-readable storage medium comprising instructions executable on a processor of the computing device for implementing the method(s).

Yet further aspects are directed towards a system for generating a calling list for a conference call, the system having a computing device on which an application executes, wherein the application is programmed to perform the steps of the method(s). The system may include a portable communication device.

The system may be operatively coupled to a telecommunications network, and may also be configured to initiate at least one call to a contact on the calling list.

These and other aspects and features of various embodiments will be described in greater detail below.

To aid in understanding the structure of a mobile device and how it communicates with other devices, reference is made to FIGS. 1B through 3.

Figure 1B:
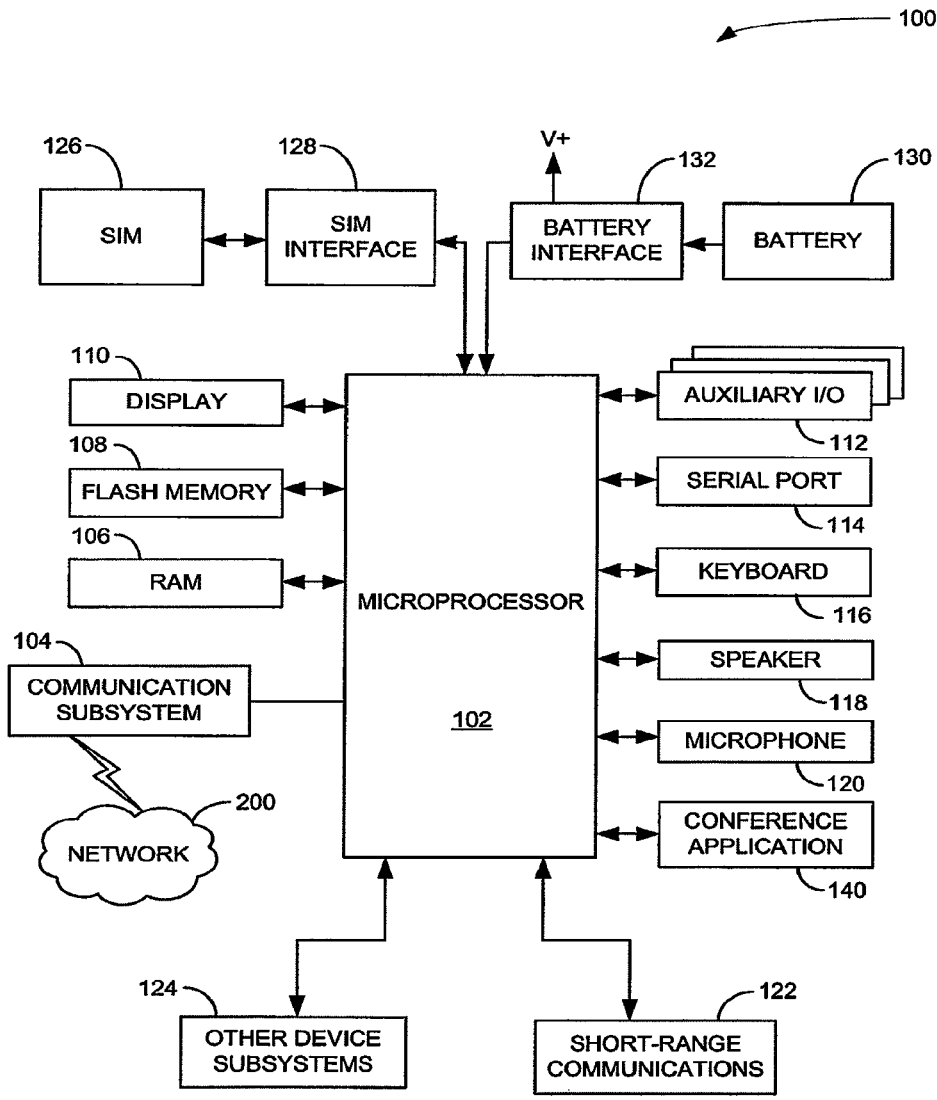
FIG. 1B is a block diagram of a mobile device in one example implementation.

Referring first to FIG. 1B, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Alternatively, by way of example only, other types of "smart cards" which might be used may include an R-UIM (removable user identity module) or a CSIM (CDMA (code division multiple access) subscriber identity module) or a USIM (universal subscriber identity module) card. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Figure 2:
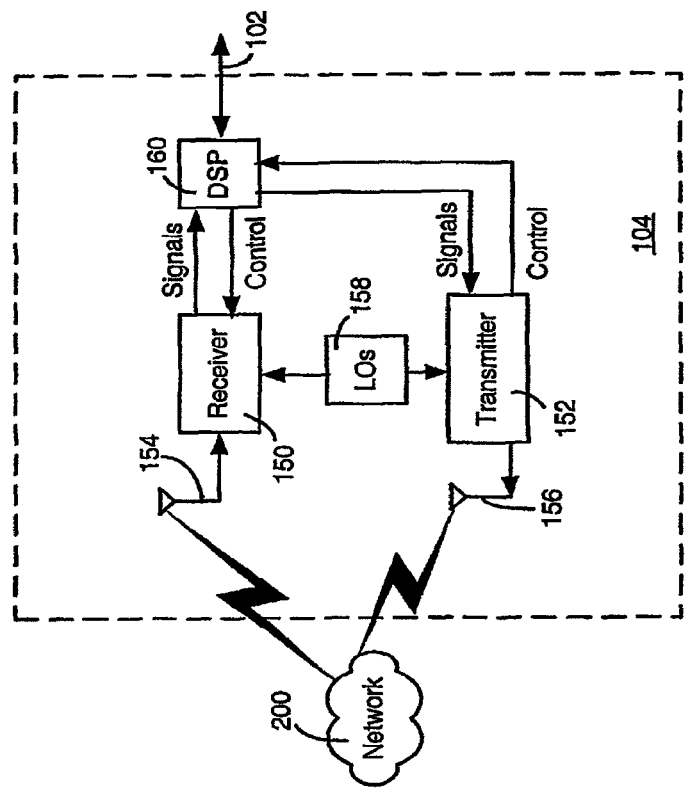
FIG. 2 is a block diagram of a communication subsystem component of the mobile device of FIG. 1B.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and network 200 may contain one or more different channels, typically different RF channels, and associated protocols used between mobile device 100 and network 200. An RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Figure 3:
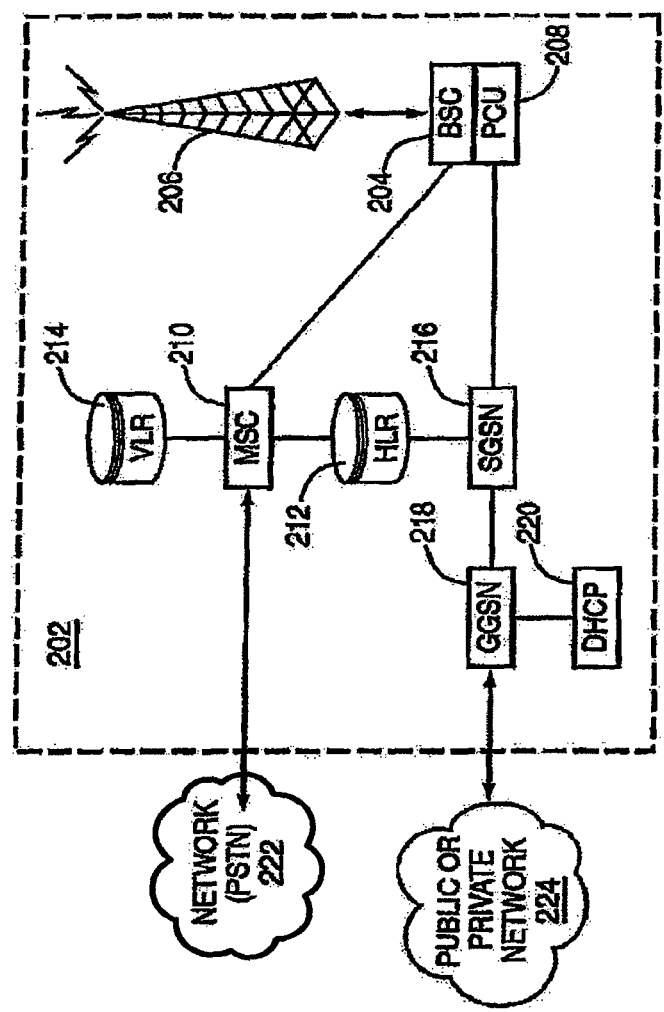
FIG. 3 is a block diagram of a node of a wireless network.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4A:
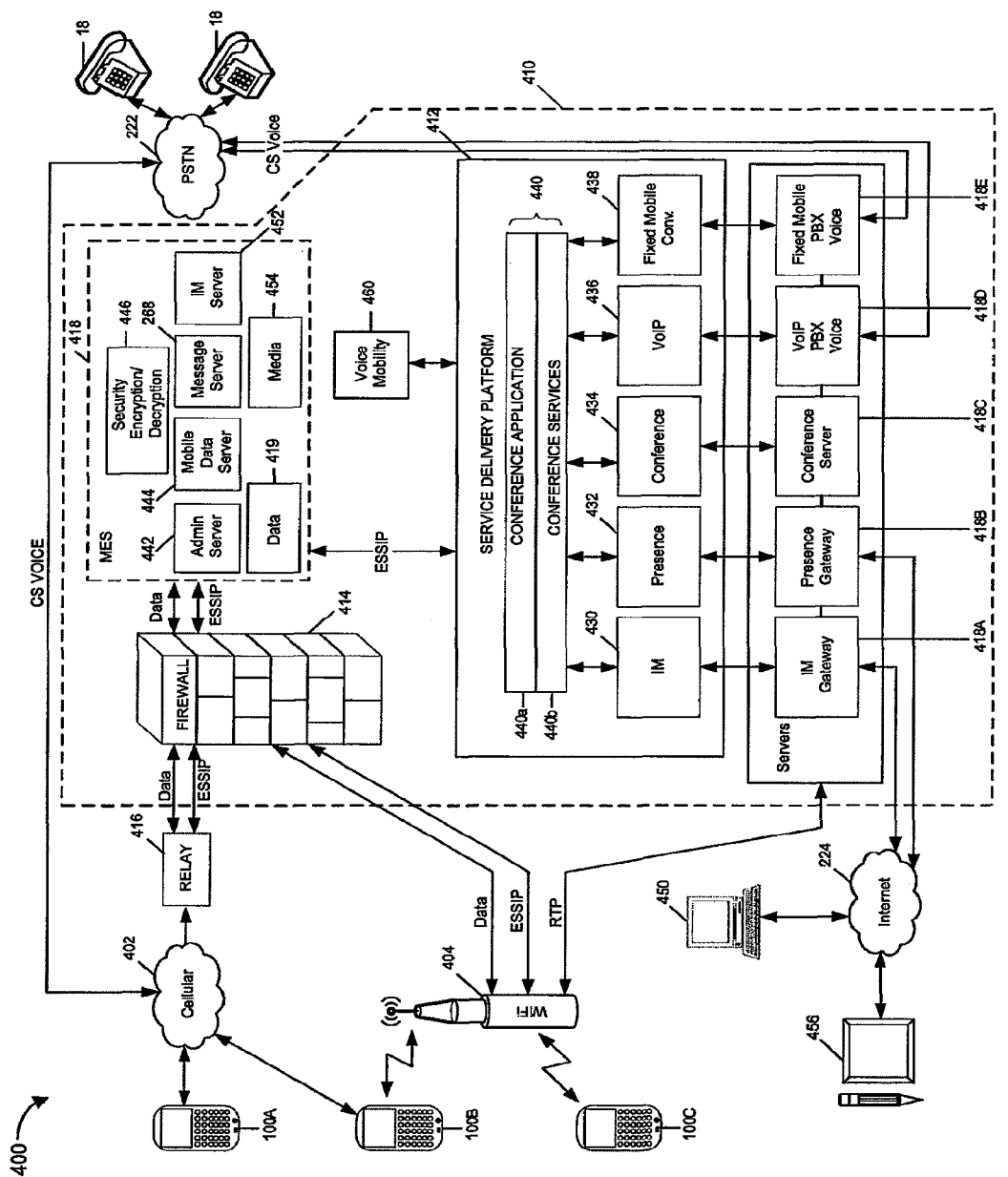
FIG. 4A is a block diagram illustrating components of a communication system in one example configuration.

Referring now to FIG. 4A, a block diagram is shown illustrating components of a communication system, shown generally as 400, in one example configuration. Host system 400 will typically incorporate a corporate office or other local area network (LAN) shown generally as 410, but may instead be a home office computer or some other private system, for example, in variant implementations. In the example shown in FIG. 4A, communication system 400 incorporates a LAN 410 of an organization to which a user of a mobile device 100 (with example embodiments illustrated as 100A, 100B, 100C) belongs.

As illustrated in FIG. 4A, some embodiments of the mobile device 100A operate on a cellular network 402 (WAN, "wide area network"), while other embodiments 100C may operate on the 802.11 WiFi network 404 only (WLAN, "wireless local area network"). Such devices 100C which operate only on a WLAN 404, may be provided with SIP-based Voice over IP (VoIP) functionality to facilitate external calling. Some embodiments of the mobile device 100B may be dual mode and may be configured to operate both on the cellular network 402 and on the WLAN. The mobile devices 100A, 100B, 100C are typically configured to utilize SIP. Preferably, the mobile device 100A, 100B, 100C SIP stack will be configured to communicate over both UDP and GME transport simultaneously.

To support multiple SIP applications on a mobile device 100A, 100B, 100C an SIP UA API (SIP User Agent Application Programming Interface) is preferably introduced. This API abstracts the applications from the SIP implementation, thus removing the need for the application programmer to know about the details of the protocol.

The SIP UA API will provide methods to construct, control and delete dialogs, a dialog being a single session between the device and some endpoint. For example, in a VoIP call a dialog is a call leg between the device and the PBX. A dialog may have none, one or multiple media streams associated. For example, a video/audio call will have two bidirectional media streams.

In addition the SIP AU API will provide means to register, reregister and deregister SIP applications from the associated registrar server. This will be implemented in such a way to abstract the details of the registration from the application, so the application is unable to modify the registration parameters or the registrar information.

Finally the SIP UA API will provide a set of methods to allow applications a way to subscribe for events from a remote server and to notify a remote server of local application events.

The connectivity of certain embodiments of the mobile devices 100A, 100B, 100C are also illustrated in FIG. 4A. As can be seen, the WAN mobile device 100A is connected through the relay 416 to the enterprise external firewall 414 and on to the Mobile Enterprise Server (MES) 418. The WLAN mobile device 100C sends and receives data by connecting over the Enterprise WLAN to the MES 418 bypassing the Relay 416. SIP based IP Telephony is provided via a direct UDP connection to the SIP server and similarly RTP between the end points. The dual mode mobile device 100B may utilize connections available to the other types of mobile devices 100A, 100C.

A Service Delivery Platform (SDP) 412 is located within the enterprise LAN 410 behind the corporate firewall 414. An SIP enabled mobile device 100A, 100B, 100C communicates with the SDP 412 usually over the GME connection either through the Relay 416 or directly with the Mobile Enterprise Server (MES) 418 if operating in serial bypass mode (e.g. WLAN Enterprise Data). On the other side of the firewall 414, the SDP 412 communicates with existing enterprise servers.

The SDP 412 typically will be involved in the control flow. The media flow, the RTP session in the embodiment illustrated in FIG. 4, routes directly to the PBXs, 418D, 418E from the mobile device 100B, 100C.

The SDP 412 is designed to be a platform upon which any number of applications may be executed. The control towards the device 100A, 100B, 100C will typically utilize a custom or enterprise-specific SIP (ESSIP), but the SDP 412 may utilize different protocols in communicating with other servers. This is illustrated in FIG. 4, where five example applications on the SDP 412, namely Instant Messaging (IM) 430, Presence 432, Conference 434, VoIP (voice over internet protocol) 436, and Fixed Mobile Convergence 438 use a variety of third-party protocols in communication with the gateway and PBX servers 418A, 418B, 418C, 418D providing the application functionality.

The MES 418 may comprise various software and/or hardware elements for administering certain communication functionality of the mobile devices 100A, 100B, 100C. For example, the MES 418 may comprise an administration server 442, a mobile data server 444, a message server 268 (discussed in greater detail below), a database 419, a security module 446 which may be configured to encrypt and decrypt data and/or messages, an IM server 452 and a media server 454.

LAN 410 may comprise a number of network components connected to each other by LAN connections. For instance, one or more users' desktop computers (not shown), each of which may comprise a cradle, may be situated on LAN 410. Cradles for mobile device 100A, 100B, 100C may be coupled to a desktop computer by a serial or a Universal Serial Bus (USB) connection, for example. Such cradles may facilitate the loading of information (e.g. PIM data, private symmetric encryption keys to facilitate secure communications between mobile device 100A, 100B, 100C and LAN 410) from a desktop computer to mobile device 100A, 100B, 100C, and may be particularly useful for bulk information updates often performed in initializing mobile device 100A, 100B, 100C for use. The information downloaded to mobile device 100A, 100B, 100C may include certificates used in the exchange of messages. It will be understood by persons skilled in the art that user computers may also be connected to other peripheral devices not explicitly shown in FIG. 4A.

Furthermore, only a subset of network components of LAN 410 are shown in FIG. 4 for ease of exposition, and it will be understood by persons skilled in the art that LAN 410 will comprise additional components not explicitly shown in FIG. 4, for this example configuration. More generally, LAN 410 may represent a smaller part of a larger network [not shown] of the organization, and may comprise different components and/or be arranged in different topologies than that shown in the example of FIG. 4A.

In one example implementation, LAN 410 may comprise a wireless VPN router [not shown] to facilitate data exchange between the LAN 410 and mobile device 100B, 100C. A wireless VPN router may permit a VPN connection to be established directly through a specific wireless network to mobile device 100A, 100B, 100C. With the implementation of Internet Protocol (IP) Version 6 (IPV6) into IP-based wireless networks, enough IP addresses will be available to dedicate an IP address to every mobile device 100B, 100C, making it possible to push information to a mobile device 100B, 100C at any time. An advantage of using a wireless VPN router is that it could be an off-the-shelf VPN component, not requiring a separate wireless gateway and separate wireless infrastructure to be used. A VPN connection might utilize Transmission Control Protocol (TCP)/IP or User Datagram Protocol (UDP)/IP connection to deliver the messages directly to mobile device 100A, 100B, 100C in such implementation.

The communication system 400 shall preferably comprise the VoIP application 436 which is configured to utilize SIP to provide VoIP functionality. The SDP 412 is configured to route VoIP ESSIP requests from the mobile device 100B, 100C to the VOIP application 436, thereby enabling IP calling from a mobile device 100B, 100C connected on the WLAN to an existing SIP enabled gateway or PBX server 418A, 418B, 418C, 418D, 418E. For example, the VoIP functionality may include basic calling features such as make and take a VoIP call, hold and resume, transfer (attended and semi attended), ad-hoc conferencing, among others.

The VoIP telephony functionality in some embodiments may be limited to those devices (such as, for example, devices 100B, 100C) that are connected to the WLAN. The use of VPN may allow devices 100B, 100C that are outside the enterprise to access enterprise VoIP services in a secure fashion.

Each third-party manufacturer's PBX (or other gateway server) 418A, 418B, 418C, 418D, 418E uses SIP in a non-uniform way. Typically, each such gateway 418A, 418B, 418C, 418D, 418E uses its own version of SIP call flow to establish, control and release calls. As a result, the SIP call flow between the endpoint (typically a communication device, such as for example, mobile device 100A, 100B, 100C) and the PBX (or gateway) 418A, 418B, 418C, 418D, 418E needs to be customized for that particular PBX (or gateway) 418A, 418B, 418C, 418D, 418E.

The VoIP application 434 incorporates a customized Back-to-Back User Agent (B2BUA) (not shown) in the Service Delivery Platform 412, positioned between the mobile device 100B, 100C and the gateway 418A, 418B, 418C, 418D, 418E. The B2BUA abstracts the details of the PBX call flows, registration, call control and configuration from the mobile device 100B, 100C. The B2BUA implements a defined set of ESSIP call flows to the mobile device 100B, 100C that can support the basic set of telephony procedures. The B2BUA also satisfies the SIP call flows that are specific to the gateway 418A, 418B, 418C, 418D, 418E for the same set of telephony procedures.

As each manufacturer's gateway server 418A, 418B, 418C, 418D, 418E typically requires a different set of call flows for the same feature, the B2BUA encapsulates the gateway 418A, 418B, 418C, 418D, 418E specifics for the basic calling feature set into a PBX Abstraction Layer (PAL), each gateway 418A, 418B, 418C, 418D, 418E having its own specific PAL.

In addition, if necessary the B2BUA can support other PBX-specific feature extensions, which may be made available to communication devices coupled to the network 410, such as the mobile devices 100B, 100C. These extensions are handled through a PBX Extension Layer (PEL) in the B2BUA, which, like the PAL, abstracts the complexities of each PBX 418A, 418B, 418C, 418D, 418E for a given extension feature set. However, as the extension feature sets between different PBX 418A, 418B, 418C, 418D, 418E will not be the same, it may not be possible to develop a common user interface (UI). Accordingly, a plug-in application may be downloaded to the communication devices coupled to the network 410, such as the mobile devices 100B, 100C, to extend the UI and to provide the communication device with the necessary SIP Application information on how to handle new features. This plug-in is the Menu and Signaling Extension Plug-in (MSP). As will be understood, the PAL, PEL and MSP are all part of Extensible Signaling Framework (ESF).

With respect to the instant messaging services, the MES 418 may comprise an XMPP2SIMPLE (Extensible Messaging and Presence Protocol to SIP Instant Messaging and Presence Leveraging Extensions) SIP application to enable integration of SIP with an IM session. For example, a voice call may be established over VoIP or over a traditional circuit switched medium directly from an IM session screen. The voice connection may be requested by either party in the IM session. As well as voice, the XMPP2SIMPLE application may also interface SIMPLE (SIP Instant Messaging and Presence Leveraging Extensions) based IM systems to the IM internal architecture of the mobile devices 100A, 100B, 100C.

The MES 418 may use an XMPP (Extensible Messaging and Presence Protocol) based API (Application Programming Interface) over an IPe (IP endpoint) secured socket provided by the XMPP2SIMPLE Application to request that SIP functions be accessed. This API may provide any user identifications that are required and routing information to the VoIP gateway. The gateway might be the VoIP PBX 418D or it might be a VoIP enabled server. The SDP 412 establishes an SIP session to the device 100A, 100B, 100C and a second to the gateway (such as the PBX 418D). The RTP media flow is routed directly to the VoIP gateway (such as the PBX 418D).

Consider a situation in which an IM session is in process between a first mobile device eg. 100B, and a second mobile device 100C. The session may use the enterprise-specific IM protocol between the devices 100B, 100C and an IM Proxy Server in the MES 418, and the third-party IM protocol between the IM Proxy Server and the IM server (eg. IM PBX 418A).

At some point in time, either device 100B, 100C, may request that the session be converted into a voice connection. The MES IM Server 452 requests over the XMPP based API that XMPP2SIMPLE set up an SIP based call. For each mobile device 100B, 100C, the XMPP2SIMPLE acts as a B2BUA, setting up one SIP session with the mobile device 100B, 100C using the ESSIP flows, and a second session with the IM Server 418A using the IM Server 418A specific SIP. These connections are then manipulated to connect the RTP media flow between the two mobile devices 100B, 100C. Communication may also be established between mobile devices 100A, 100B, 100C and other networked devices, such as, for example, computer 450 (which may be equipped to provide voice communication, for example using VoIP) and electronic "whiteboard" 456 (via the internet 224), and telephones 18 (via the PSTN).

Alternatively, a call may be established over circuit switched media. For example, an IM session running on a WAN mobile device 100A may request the establishment of a voice connection. In this case the MES IM Server 452 could request directly to the Fixed Mobile PBX 418E for a circuit switched call, or through the SDP 412 which would establish two circuit switched call legs, one to each party, via the PBX 418E.

The communication system 400 may also provide for certain applications to interact directly with other application services, e.g. applications that provide media streaming capabilities such as e-learning or MP3/video playback, downloading and sharing. Consider a scenario in which an enterprise-wide announcement is to be made. Here the announcement is stored in a MES service which proceeds to call out to all enterprise mobile devices 100A, 100B, 100C.

These services may require a multimedia session to be established between a server and the ESSIP enabled devices 100A, 100B, 100C. In addition there are a number of other servers such as Lightweight Directory Access Protocol (LDAP) servers, location servers, a database application, or an extensible markup language (XML) application. These application services provide back-end services such as directory, authentication, and billing services.

In this case the MES media application or server 454 might again be configured to use an API to set up the multimedia session or to obtain information from the SDP 412. The SDP 412 acts as a UAS, controlling the session and setting the RTP or similar stream directly to the MES Media Server 454. Once the multimedia streaming session has finished, the MES Media Server 454 terminates the SIP session via an API call.

The communication system 400 may also be configured with a voice mobility module 460 (such as the Voice Mobility Management system distributed by Ascendent Systems) which may comprise software and hardware to offer voice mobility anchored at the network between WLAN 404 and cellular networks 402. The system 400 may offer enhancements such as single number in and out of the enterprise, conferencing, single voice mailbox, etc.

The voice mobility module 460 may use the SIP server through CSTA interface that allows first party call control. The interface between the SDP 412 and the PBX 418D, 418E may be SIP Trunk.

In this environment, the voice mobility module 460 controls the media flow passing over the RTP session.

The SDP 412 may interface to the MES 418 for signaling to the device 100A, 100B, 100C and database support, and to the application servers such as the gateway or PBX servers 418A, 418B, 418C, 418D, 418E for application support. This section shall describe in more detail how those interfaces are to be managed.

The SDP 412 may interface to the MES 418 through an ESSIP Connector, a service that communicates directly with a Dispatcher. The ESSIP Connector terminates the GME protocol and is responsible for pushing the SIP signals to an SIP Server (not shown) over a TLS secured socket. This arrangement requires that a new content type be created for SIP, and allows a new ESSIP service book to be pushed to a mobile device 100A, 100B, 100C.

On the other side of the SIP/TLS link, the SDP 412 may also comprise a Unified Communications (UC) Server (not shown). The UC Server executes the SIP applications and communicates to the gateway and PBX servers 418A, 418B, 418C, 418D, 418E, MES IM Server 452, IM server 418A, and voice mobility module 460, etc.

Any number of ESSIP Connectors may support access to a single UC Server, the exact number being limited by the configuration of the components over hardware platforms. All configurations using a single UC Server must be connected to the same mobile device database domain.

Both the ESSIP Connector and the UC Server may read data for configuration from the database 419 via an SDP MES Management Server using a web services interface. This component also offers the SDP administration UI.

The UC Server stores information on the MES database 419, which is used at reset to configure the UC Services and users. The following items may be included in the basic server configuration: Sip Realm; Sip Domain Name; Sip Server Address; Sip Server Port; Sip Server Transport; Proxy Server Address; Proxy Server Port; and Proxy Server Transport.

The following items may also be included as part of the database 419 per user: Sip User Display Name; Sip User ID; Sip User Password; Sip Realm; Sip Registration Timeout; Sip Local Port; Sip RTP Media Port; Sip Domain Name; Sip Server Type; Sip Server Address; Sip Server Port; Sip Server Transport; Emergency Number; Sip Secondary Server Type; Sip Secondary Server Address; Sip Secondary Server Port; and Sip Secondary Server Transport.

The UC Server may also require notification from the database 419 when an administrator adds a user into the system 400 so that it can update the internal table without scanning the whole database 419.

The SDP Management Server (SDP MS) (not shown) may abstract the MES database 419 from the SDP 412 components and provides a user interface for administration purposes. The ESSIP Connector and the UC Server will both obtain configuration through the SDP BMS. As the users of UC Services will also be the general MES users, then those configuration items that are specific to each user will require additions to existing user records.

The communications network 400 is preferably also provided with a conference call controller module 440 configured to facilitate and control conference calls between two or more parties. As will be discussed in greater detail, below, the controller module 440 may comprise an application or other programming and is configured to coordinate the conference call functionality and to facilitate the exchange of voice and other media between conference call participants. The controller module 440 may comprise conference application 440a and conference services modules 400b and may reside in or otherwise form part of the SDP 412.

Messages intended for a user of mobile device 100 are initially received by a message server 268 of LAN 410, which may form part of the MES 418. Such messages may originate from any of a number of sources. For instance, a message may have been sent by a sender from a computer 450 within LAN 410, from a different mobile device [not shown] connected to wireless network 200 (or 404) or to a different wireless network, or from a different computing device (such as computer 450) or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 410 may comprise multiple message servers 268. Message server 268 may also be adapted to provide additional functions beyond message management, including the management of data associated with calendars and task lists, for example.

Figure 4B:
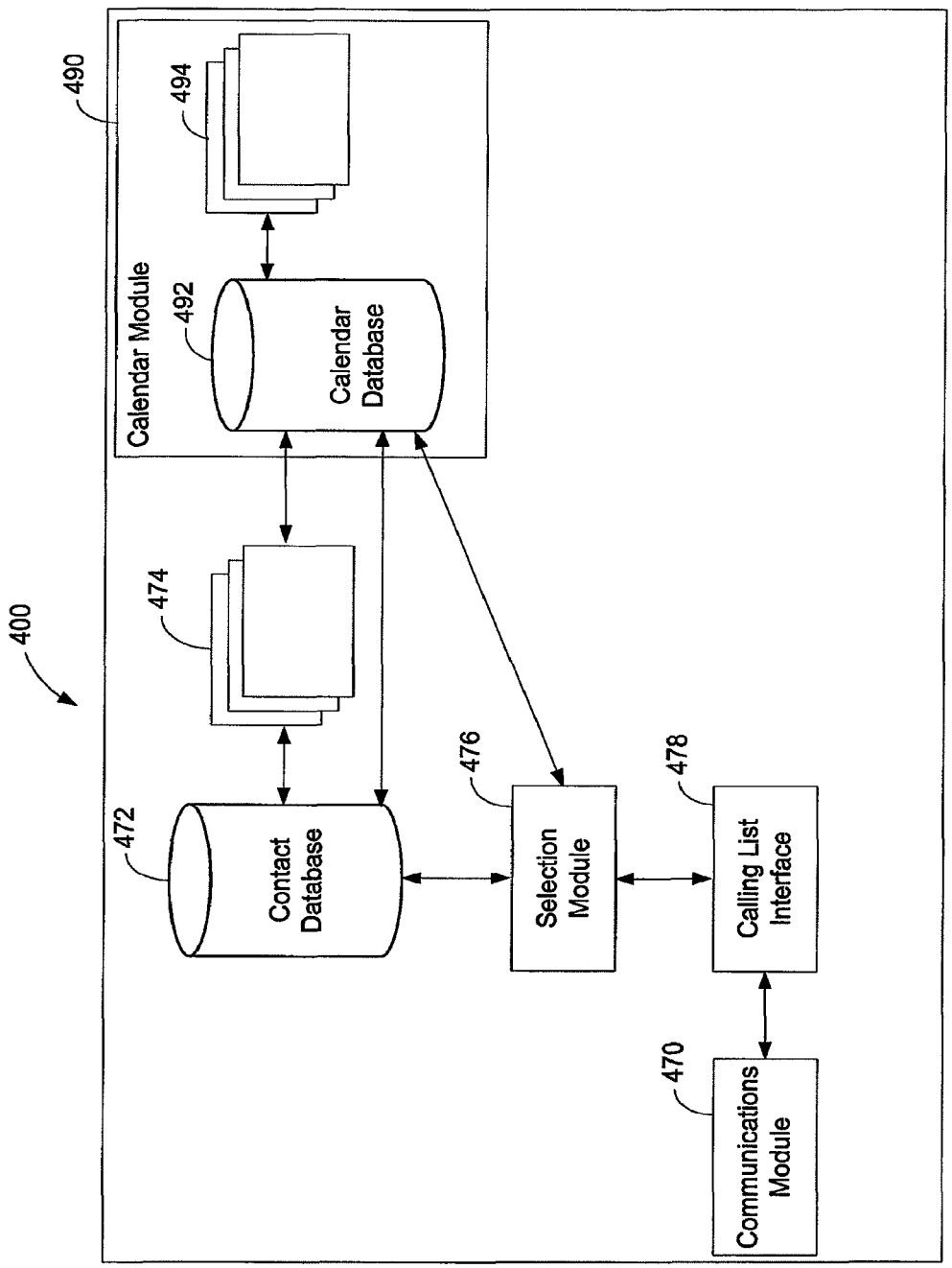
FIG. 4B is a block diagram illustrating components of the communication system of FIG. 4A, such components being configured to generate a calling list.

Referring now to FIG. 4B, certain components of the communication system 400 as configured to generate a calling list, are shown and described in further detail. The communication system 400 includes a communications module 470 configured to establish communications (typically including facilitating conference calls via a telecommunications network), which may be in the form of LAN 410, for example, and a contact database 472 which may be stored in memory or other data storage. The contact database 472 is configured to store a plurality of contact records 474 each containing data corresponding to a different contact. The communications system 400 may also include a selection module 476 having computer program instructions stored within memory storage (which may include flash memory, or other computer readable storage medium) for execution by a processor/CPU.

A calling list interface 478 is also provided which includes computer program instructions and is operatively coupled to the selection module. The calling list interface 478 is configured to receive input corresponding to at least one qualifier criteria and output calling list data to the user, as will be discussed in greater detail, below, and may include a computer having appropriate I/O capability, such as computer 450. Alternatively, the communication system 400 may be operatively coupled to a mobile device 100, and the calling list interface 478 may comprise the keyboard 116 or one or more of the user input components in the auxiliary I/O subsystem 112, such as a thumbwheel, trackball, directional pad, joystick, or touchscreen which enable the user to select or otherwise generate user input received by the CPU 102 and designating at least one qualifier criteria the user wishes to input, and/or the display 110.

The selection module 476 is operatively coupled to the contact database 472, and is configured to generate a list of proposed conference call participants from the contact database 472, based at least in part on the qualifier criteria input via the calling list interface 478, as will be discussed in greater detail below.

Figure 4C:
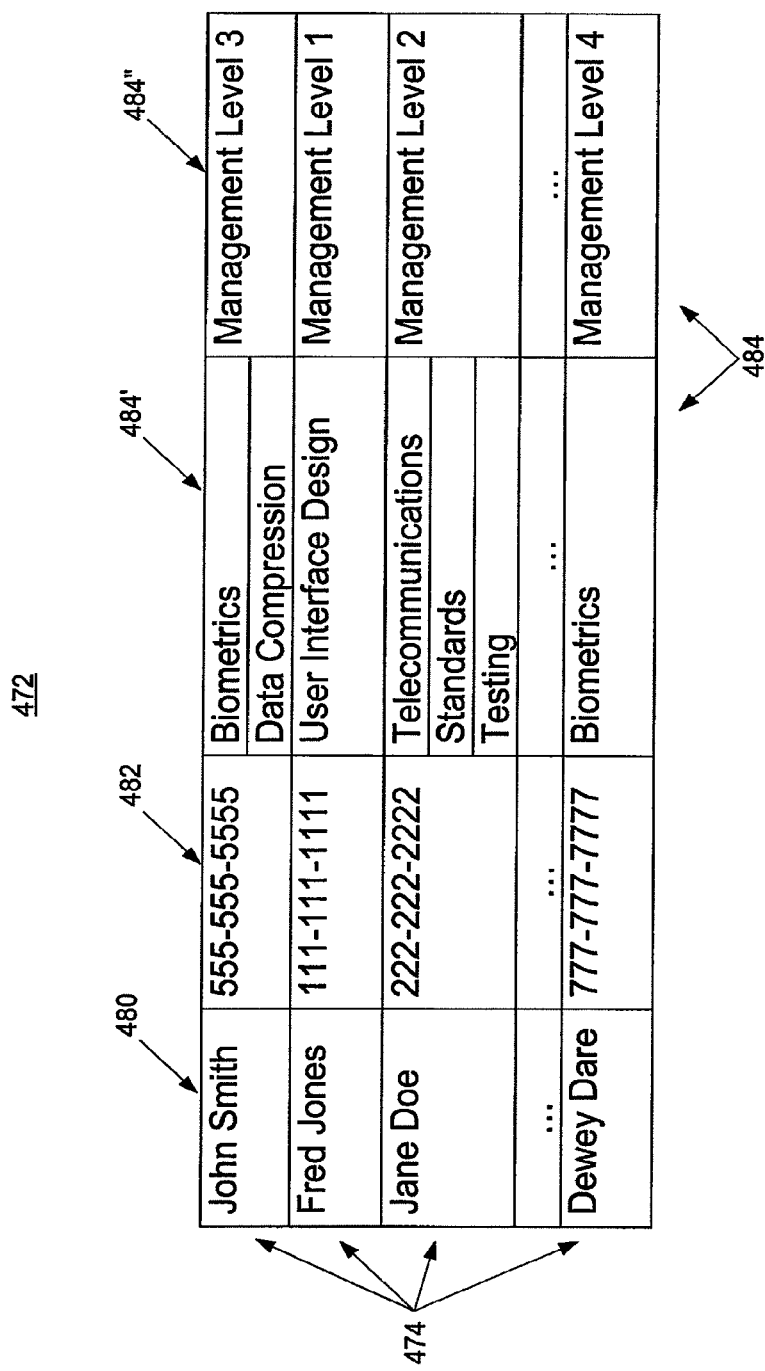
FIG. 4C is a schematic diagram illustrating example contact records as may be stored in the contact database of FIG. 4B.
Figure 4D:
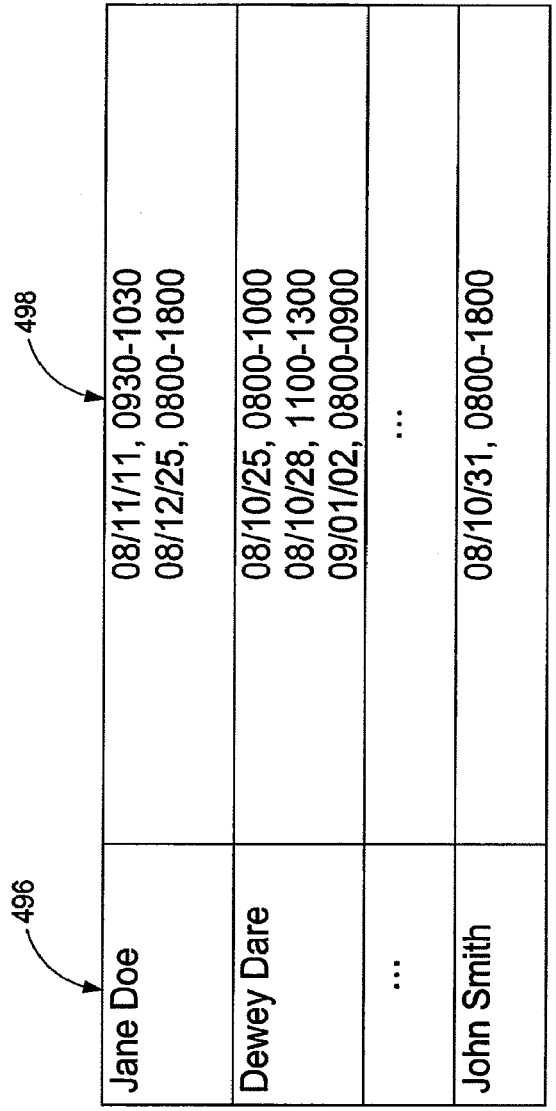
FIG. 4D is a schematic diagram illustrating example scheduling records as may be stored in the calendar database of FIG. 4B.

Referring briefly to FIG. 4C, illustrated therein are example contact records 474 as may be stored in the contact database 472. Each contact record 474 preferably stores a contact identifier 480, such as a name, in addition to at least one contact address 482, such as a phone number. The contact records 474 may also store at least one descriptor 484, such as area(s) of expertise 484' and job title/management level 484". Different data types (e.g. email addresses (in the case of contact addresses 482), areas of interest (rather than areas of expertise, etc., in the case of descriptors 484) may be stored in the contact records 474, for different applications. The number of and type of descriptors may vary for different applications.

Figure 5:
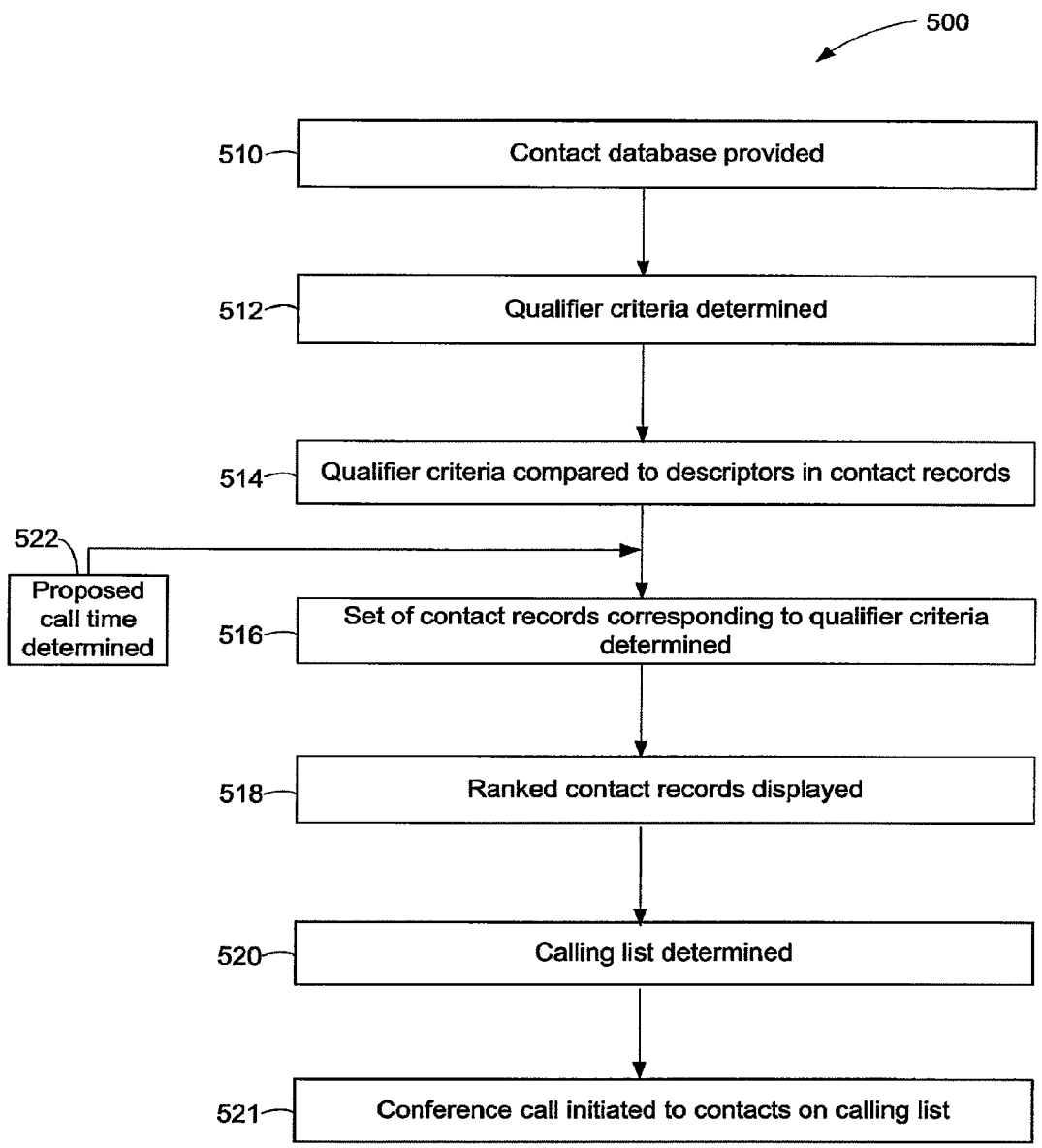
FIG. 5 is a flowchart illustrating steps in a method of generating a calling list in accordance with at least one embodiment.

Referring now to FIG. 5, a flowchart illustrating steps in a method of generating a calling list in accordance with at least one embodiment is shown generally as 500. Additional details of some of the features described below in respect of the method 500 may be described elsewhere in the present specification.

In one embodiment, at least some of the steps of the method are performed by a calling list application (e.g. selection module 476) that executes and resides on a conference call controller (e.g. conference call controller 440 of FIG. 4). In variant embodiments, the conference call application need not be a stand-alone application, and the calling list generation functionality may be implemented in one or more applications executing and residing on the controller or other computing device (eg. conference application 140 on mobile device 100).

Method 500 commences at Block 510 in which a contact database 472 has been provided. As noted previously, the contact database 472 comprises a plurality of contact records 474, each record 474 corresponding to a different contact and having at least one descriptor 484. At least one qualifier criteria may be determined and typically input via the calling list interface 478 (Block 512). The selection module 476 may then compare the input qualifier criteria to the descriptors 484 stored in the contact records 474 (Block 514), to determine a set of at least one contact records 474 corresponding to the input qualifier criteria (Block 516).

As will be understood, the contact records 474 may have different degrees of correspondence to the qualifier criteria, depending on how closely the corresponding descriptors match to the qualifier criteria. Accordingly, in some embodiments, the selection module 476 may rank the contact records 474 in the set determined in Block 516, and some or all of the ranked contact records 474 in the set may be displayed to the user (Block 518), for example on the display 110 if the user is using a mobile device 100, or the display on computer 450. The user may then determine a calling list by selecting one or more appropriate contacts from the ranked set (Block 520). The system 400 may then initiate a conference call to the various contacts on the calling list (including the user), if the system 400 is operatively coupled to a telecommunications network (Block 521). The timing of the conference call may coincide with the proposed call time determined in Block 522 discussed below (if appropriate), or may occur as a result of a command from the user to commence the conference call.

In some embodiments, the communication system 400 may further be provided with a calendar module 490 operatively coupled to the selection module 476. As illustrated in FIG. 4B, the calendar module 490 may include a calendar database 492 containing scheduling records 494 corresponding to at least one contact/contact record 474. As illustrated by the example scheduling records 494 in the calendar database 492 of FIG. 4D, the scheduling records 494 may contain a schedule identifier 496 (such as a name), in addition to availability data 498 corresponding to dates and times in which the contact is not available (e.g. because of previously-scheduled meetings, holidays, etc.), and presumably would be available to participate in a conference call at any other time during regular business hours. Alternatively, as will be understood, the availability data may correspond directly to dates and times in which the contact would be available to participate in a conference call.

In such embodiments in which availability data 498 is provided, the method may further comprise determining a proposed call time (Block 522). In such embodiments, the user might input (via the calling list interface 478) a proposed duration for the proposed conference call. Alternatively, the proposed call time might be determined and input by the user, with the set of contact records 474 determined in Block 516 being filtered in accordance with their availability data 498 corresponding to the proposed call time (ie. those records 474 for which the corresponding contacts are unavailable might be removed from the set). Alternatively, the proposed call time might be determined by the selection module 476 comparing the availability data 498 for the contacts in the set of contact records 474 determined in Block 516 and determining a proposed call time for which most contacts would be available for a conference call (and consequently removing the contact records 474 from the set which are unavailable at the proposed call time).

Figure 6:
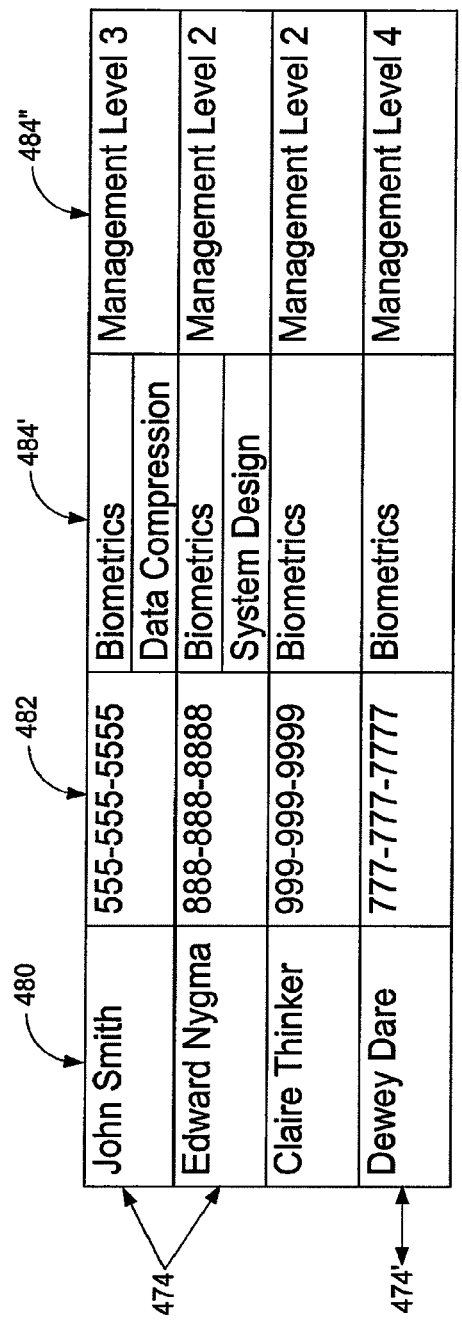
FIG. 6 is a schematic diagram illustrating an example set of ranked contact records as may be generated by the method of FIG. 5.

Referring to FIG. 6, illustrated therein is an example of a set 600 of ranked contact records 474, as may have been generated in Block 518 after a user has initiated the generation of a calling list and input to the system 400 qualifier criteria corresponding to "biometrics" and preferably having a management level 484" of "3" or higher (in the example, a management level of "1" being considered the highest or most senior level of management). In the example set 600, the lowest-ranked record 474' corresponds to a contact having the name "Dewey Dare". The record 474' is lowest-ranked because the record 474' only partially matches the qualifier criteria (while the other records 474 in the set 600 fully match the qualifier criteria in the example). While the record 474' includes "biometrics" in its expertise descriptor 484', the management level descriptor 484" value is a level "4", which is "below" the qualifier criteria requirement of "3" or more senior. The user may then choose to exclude the record 474' for Mr. Dewey from the set 600 (or any other record 474), or may decide to keep all the records 474 in the calling list, if as in this example, the number of potential call participants is relatively small. In such instance, the calling list would appear identical to the set 600.

The steps of the method of generating a calling list in accordance with any of the embodiments described herein may be provided as executable software instructions stored on computer-readable media, which may include transmission-type media.

The disclosure has been described with regard to a number of embodiments. However, it will be understood by persons skilled in the art that other variants and modifications may be made without departing from the scope of the disclosure as defined in the claims appended hereto.

The invention claimed is:

1. A computer-implemented method of generating a conference call calling list, the method comprising:
    determining, by a processor, a qualifier criteria;
    accessing, by the processor, a contact database comprising a plurality of contact records, each contact record corresponding to a different contact, wherein each contact record comprises a contact identifier, a contact address, and a descriptor that is different from the contact identifier and the contact address;
    comparing, by the processor, the qualifier criteria to the descriptor;
    determining, by the processor, at least one contact record, having a descriptor that meets the at least one qualifier criteria, for inclusion on the calling list; and
    ranking, by the processor, the at least one contact record in the calling list based on a degree of correspondence of the descriptor to the at least one qualifier criteria.

2. The method as claimed in claim 1, further comprising:
    displaying the list of contacts in ranked order; and
    selecting at least one contact record from the list.

3. The method as claimed in claim 1, further comprising:
    providing availability data corresponding to at least one of the contacts; and
    comparing the availability data in determining a calling list.

4. The method as claimed in claim 3, further comprising:
    determining a proposed call time; and
    wherein the calling list is determined corresponding to the proposed call time.

5. The method as claimed in claim 4, wherein determining the proposed call time comprises comparing the availability data of the at least one of the contacts.

6. The method as claimed in claim 1, wherein the contact identifier includes a name of a contact, and the contact address includes a phone number or email address of the contact.

7. The method as claimed in claim 6, wherein the descriptor includes information describing characteristics of the contact.

8. The method as claimed in claim 1, wherein the selection module is executable on a mobile device.

9. A non-transitory computer-readable medium that stores a set of instructions that are executable by at least one processor of a computing device to cause the computing device to perform a method for generating a conference call calling list, the method comprising:

determining a qualifier criteria;

accessing a contact database comprising a plurality of contact records, each contact record corresponding to a different contact, wherein each contact record comprises a contact identifier, a contact address, and a descriptor that is different from the contact identifier and the contact address;

comparing the qualifier criteria to the descriptor;

determining at least one contact record, having a descriptor that meets the at least one qualifier criteria, for inclusion on the calling list; and ranking the at least one contact record in the calling list based on a degree of correspondence of the descriptor to the at least one qualifier criteria.

10. An apparatus for generating a conference call calling list, the apparatus comprising:

a computing device programmed to:

determine a qualifier criteria;

access a contact database comprising a plurality of contact records, each contact record corresponding to a different contact, wherein each contact record comprises a contact identifier, a contact address, and a descriptor that is different from the contact identifier and the contact address;

compare the qualifier criteria to the descriptor;

determine a calling list corresponding to at least one of the contacts; and rank the at least one contact record in the calling list based on a degree of correspondence of the descriptor to the at least one qualifier criteria.

* * * * *